US009996554B2

(12) United States Patent
Yano et al.

(10) Patent No.: US 9,996,554 B2
(45) Date of Patent: Jun. 12, 2018

(54) SEARCH APPARATUS, SEARCH METHOD, AND STORAGE MEDIUM

(71) Applicant: CANON KABUSHIKI KAISHA, Tokyo (JP)

(72) Inventors: Kotaro Yano, Tokyo (JP); Satoshi Yashiro, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 39 days.

(21) Appl. No.: 14/529,676

(22) Filed: Oct. 31, 2014

(65) Prior Publication Data

US 2015/0154472 A1 Jun. 4, 2015

(30) Foreign Application Priority Data

Nov. 29, 2013 (JP) ................................. 2013-248344

(51) Int. Cl.
G06K 9/68 (2006.01)
G06F 17/30 (2006.01)
G06K 9/00 (2006.01)

(52) U.S. Cl.
CPC ... *G06F 17/30247* (2013.01); *G06K 9/00771* (2013.01); *G06K 2009/00322* (2013.01)

(58) Field of Classification Search
None
See application file for complete search history.

(56) References Cited

U.S. PATENT DOCUMENTS

| 6,584,221 | B1 * | 6/2003 | Moghaddam ..... G06F 17/30256 382/165 |
| 7,472,134 | B2 * | 12/2008 | Kaku ................ G06F 17/30259 |
| 7,699,423 | B2 | 4/2010 | Suwa et al. |
| 8,787,629 | B2 | 7/2014 | Kaneda et al. |
| 8,923,554 | B2 | 12/2014 | Yano |
| 8,929,595 | B2 | 1/2015 | Suzuki et al. |
| 2002/0001468 | A1 * | 1/2002 | Kaku ..................... G03B 15/00 396/310 |
| 2012/0092495 | A1 | 4/2012 | Yano |
| 2012/0288152 | A1 | 11/2012 | Yano |
| 2013/0064425 | A1 | 3/2013 | Sagawa et al. |

(Continued)

FOREIGN PATENT DOCUMENTS

| JP | 2004-054888 A | 2/2004 |
| JP | 2009-199322 A | 9/2009 |
| JP | 2010-239992 A | 10/2010 |

OTHER PUBLICATIONS

Henning Muller et al, Strategies for positive and negative relevance feedback in image retrieval, IEEE 2000.*

(Continued)

*Primary Examiner* — Mark Roz
(74) *Attorney, Agent, or Firm* — Fitzpatrick, Cella, Harper & Scinto

(57) ABSTRACT

A search apparatus comprises a determining unit configured to determine a plurality of attributes of an object designated in a first image, and determine a plurality of attributes of an object that is different from the designated object; and a search unit configured to search a second image for the designated object in accordance with a search condition based on the plurality of attributes of the designated object and the plurality of attributes of the object that is different from the designated object.

9 Claims, 4 Drawing Sheets

(56) References Cited

U.S. PATENT DOCUMENTS

2013/0142401 A1    6/2013   Nomoto et al.
2013/0142426 A1    6/2013   Kaneda et al.

OTHER PUBLICATIONS

Microsoft Community, "Sorting by date and time for multiple cameras", Feb. 2012.*
Chelappa et al, Human and Machine Recognition of Faces: A Survey; IEEE 1995.*
Perez, et al., "Color-Based Probabilistic Tracking", ECCV, pp. 661-675 (2002).
Dalal, et al., "Histograms of Oriented Gradients for Human Detection", CVPR (2005).
U.S. Appl. No. 14/533,394, filed Nov. 5, 2014. Applicant: Yano, et al.
Japanese Office Action dated Aug. 25, 2017 in Japanese Patent Application No. 2013248344.

* cited by examiner

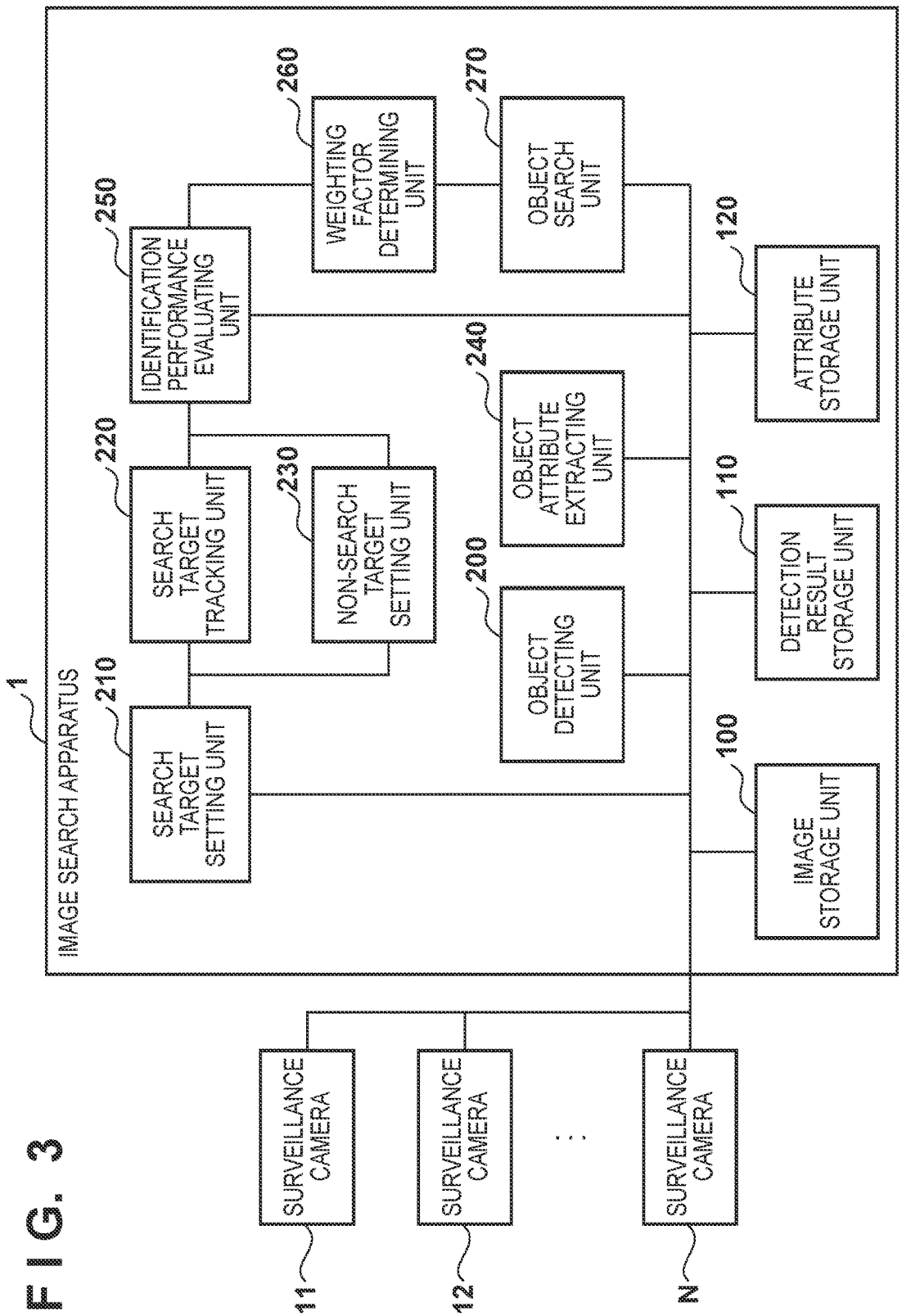

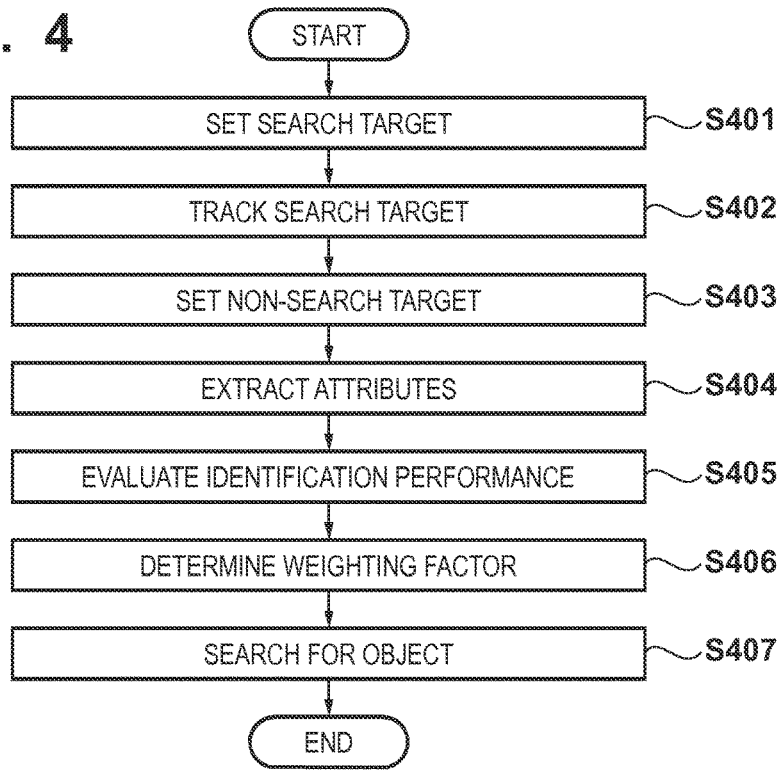
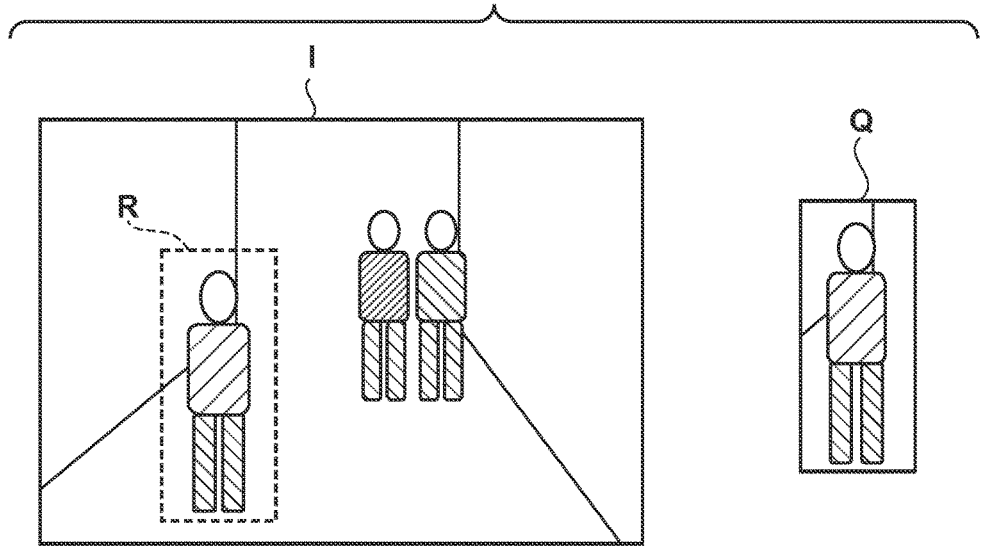

SEARCH APPARATUS, SEARCH METHOD, AND STORAGE MEDIUM

BACKGROUND OF THE INVENTION

Field of the Invention

The present invention relates to a search apparatus that searches for an object, a search method, and a storage medium.

Description of the Related Art

Many surveillance cameras have been installed in recent years to monitor people. A large number of systems that support operations of such surveillance cameras are proposed, and some of the systems have a function of searching a large number of images captured by the surveillance cameras for a specific person.

In the case of searching an enormous number of images of a surveillance camera system for a specific person, the following scenario can be assumed. That is, the surveillance cameras and the times are narrowed down based on information regarding where and what time a search target person was in, and the images of the person are retrieved from among the images captured in the past. Furthermore, search is performed on a large number of surveillance camera images to find where the search target person is currently present.

However, it is practically difficult to rapidly search a large number of surveillance camera images for images of a person, and the search target person moves if it takes a long period of time to perform a search. Accordingly, applications are available that search for a similar person by using, as a query, a person image retrieved from the images captured in the past.

Japanese Patent Laid-Open No. 2009-199322 discloses a method for searching surveillance video for a person by determining the sameness between a search target image and the person being captured, with the use of a face feature amount and a clothing feature.

However, Japanese Patent Laid-Open No. 2009-199322 is problematic in that because collective similarity is determined by using the sum of simple similarities of a plurality of attributes of a person, if the distribution of the attributes of the search target is not uniform, it is not possible to perform an efficient search.

In view of the problem described above, the present invention provides a technique for performing an efficient search.

SUMMARY OF THE INVENTION

According to one aspect of the present invention, there is provided a search apparatus comprising: a determining unit configured to determine a plurality of attributes of an object designated in a first image, and determine a plurality of attributes of an object that is different from the designated object; and a search unit configured to search a second image for the designated object in accordance with a search condition based on the plurality of attributes of the designated object and the plurality of attributes of the object that is different from the designated object.

Further features of the present invention will become apparent from the following description of exemplary embodiments with reference to the attached drawings.

BRIEF DESCRIPTION OF THE DRAWINGS

FIG. 3 is a diagram showing a functional configuration of the image search apparatus according to an embodiment of the present invention.

FIG. 4 is a flowchart illustrating a procedure of processing performed by the image search apparatus according to an embodiment of the present invention.

FIG. 5 is a diagram showing an example of how a search target is set according to an embodiment of the present invention.

DESCRIPTION OF THE EMBODIMENTS

Hereinafter, embodiments of the present invention will be described with reference to the accompanying drawings.

Figure 1:
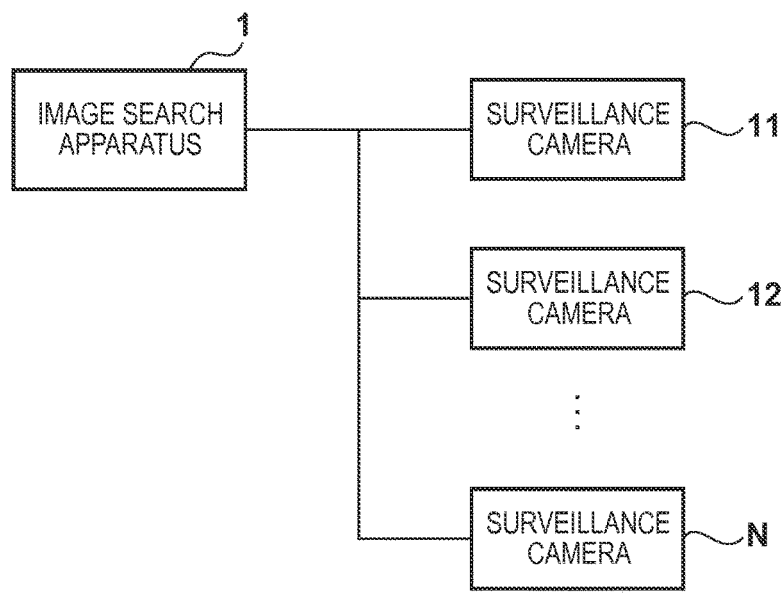
FIG. 1 is a diagram showing an example of a configuration of a surveillance system including an image search apparatus according to an embodiment of the present invention.

An image search apparatus 1 according to a first embodiment of the present invention is connected by wire or wirelessly to a plurality of capturing apparatuses (surveillance cameras 11, 12, . . . and N) as shown in FIG. 1, thereby forming a surveillance system. Only one capturing apparatus is sufficient, and the image search apparatus and the capturing apparatus may be combined to form a unitary configuration.

1. Hardware Configuration of Image Search Apparatus

Figure 2:
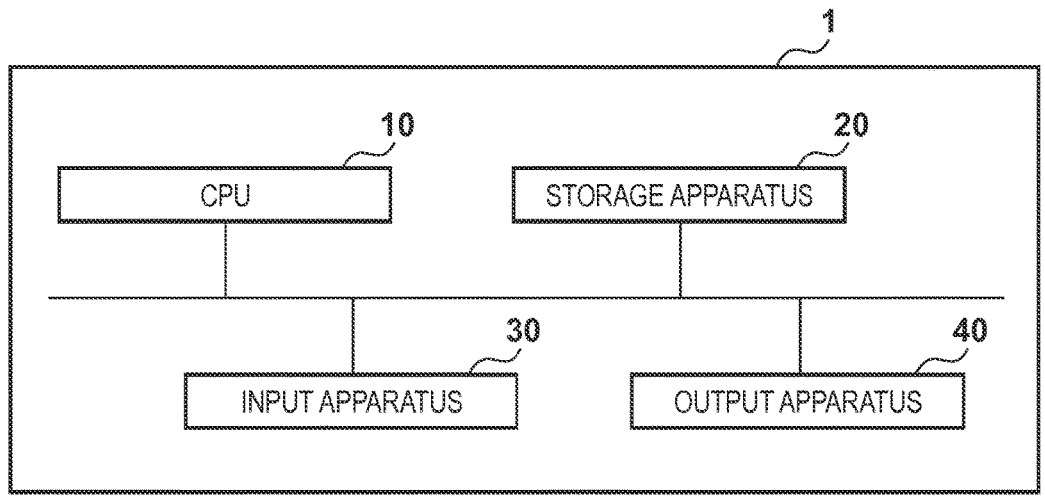
FIG. 2 is a diagram showing a hardware configuration of the image search apparatus according to an embodiment of the present invention.

FIG. 2 is a diagram showing a hardware configuration of the image search apparatus 1 according to the present embodiment. The image search apparatus 1 includes a central processing unit (CPU) 10, a storage apparatus 20, an input apparatus 30, and an output apparatus 40. These apparatuses are configured so as to be capable of communication with one another, and are connected with a bus or the like.

The CPU 10 is a computer, and is configured to control the operations of the image search apparatus 1 and execute programs stored in the storage apparatus 20. The storage apparatus 20 is a storage device such as a magnetic storage apparatus or a semiconductor memory, and is configured to store, therein, programs that are executed by the CPU 10, data that need to be stored for a long period of time, and the like. In the present embodiment, the functions of the image search apparatus 1 and the processing illustrated in a flowchart described later are implemented by the CPU 10 reading and executing a program stored in the storage apparatus 20.

The input apparatus 30 is a mouse, a keyboard, a touch panel device, a button or the like, and is configured to receive input of various types of user instructions. The input apparatus 30 also receives input of captured images from one or a plurality of capturing apparatuses. The output apparatus 40 is a liquid crystal panel, an external monitor or the like, and is configured to output various types of information.

The hardware configuration of the image search apparatus 1 is not limited to the configuration described above. For example, the image search apparatus 1 may include an I/O apparatus for performing communication between various types of apparatuses. The I/O apparatus may be, for example, an input/output unit such as a memory card or a USB cable, or a wired or wireless transmission/reception unit. The input apparatus 30 and the output apparatus 40 may be provided outside the image search apparatus 1.

2. Functional Block Configuration of Image Search Apparatus

FIG. 3 is a diagram showing a functional configuration of the image search apparatus 1 according to the present embodiment. The processing and functions of the image search apparatus 1 are implemented by the units shown in FIG. 3.

The image search apparatus 1 includes an image storage unit 100, a detection result storage unit 110, an attribute storage unit 120, an object detecting unit 200, a search target setting unit 210, a search target tracking unit 220, a non-search target setting unit 230, an object attribute extracting unit 240, an identification performance evaluating unit 250, a weighting factor determining unit 260, and an object search unit 270.

The image storage unit 100 stores, therein, images captured by the plurality of surveillance cameras 11, 12, . . . and N, the images being images in which a search is performed. The number of surveillance cameras connected to the image search apparatus 1 may be one. Each image is managed by being associated with the type of surveillance camera that captured the image, the captured time and the like. The detection result storage unit 110 stores, therein, the results (position coordinates indicating a person region, and the like) of detection performed by the object detecting unit 200. The attribute storage unit 120 stores, therein, the results (person's age, and the like) of extraction performed by the object attribute extracting unit 240.

The object detecting unit 200 detects a specific object (for example, a person) from an image stored in the image storage unit 100. The object detecting unit 200 stores, in the detection result storage unit 110, the position coordinates indicating a region in the image in which the specific object detected from the image is present, and the frame number of the image from which the specific object was detected. The search target setting unit 210 sets a search target in the image stored in the image storage unit 100. This setting is performed based on an input from the user via the input apparatus 30. The search target tracking unit 220 tracks the search target set by the search target setting unit 210 from the images stored in the image storage unit 100.

The non-search target setting unit 230 sets targets other than the search target set by the search target setting unit 210 from the images stored in the image storage unit 100, as non-search targets. The object attribute extracting unit 240 extracts a plurality of object attributes (person's age, and the like) from the image stored in the image storage unit 100.

The identification performance evaluating unit 250 evaluates the identification performance of each of the plurality of object attributes based on statistical information of the object attributes extracted by the object attribute extracting unit 240. The weighting factor determining unit 260 determines the weighting factor for each of the plurality of object attributes based on the results of evaluation performed by the identification performance evaluating unit 250.

The object search unit 270 searches the images stored in the image storage unit 100 for a search target object based on the results obtained by combining the weighting factors determined by the weighting factor determining unit 260 and the similarities in each of the plurality of objet attributes extracted by the object attribute extracting unit 240.

The configuration of the functional blocks described above is merely an example. Accordingly, a plurality of functional blocks may constitute one functional block. Alternatively, any one of the functional blocks may further include a plurality of functional blocks. Also, not all of the functional blocks need to be included, and some of the functional blocks may be omitted. The functional blocks are implemented by the CPU 10 executing a program read from the storage apparatus 20.

3. Processing Performed by Image Search Apparatus

Hereinafter, a procedure of processing performed by the image search apparatus 1 according to the present embodiment will be described with reference to the flowchart shown in FIG. 4. It is assumed, when performing the processing of the present embodiment, that the images, on which search is performed, are stored in advance in the image storage unit 100. The flowchart shown in FIG. 4 represents a computer program that is read from the storage apparatus 20 and executed by the CPU 10, which is a computer.

S401: Search Target Setting Processing

First, the search target setting unit 210 sets a search target in an image stored in the image storage unit 100. At the time of setting the search target, images stored in the image storage unit 100 are displayed on the output apparatus 40, and the user designates, as a partial region, a target he/she wants to search for in each of the images captured by the plurality of surveillance cameras 11, 12, . . . and N, with the use of the input apparatus 30.

FIG. 5 shows an example of how a search target is set. I indicates an image containing a search target, R indicates a partial region designated by the user, and Q indicates a search target image. The identification number of the surveillance camera set by the user, the frame number (in one to one correspondence with the captured time) of the image in the surveillance camera images, and the position coordinates indicating a target region in the image set by the user are stored in the storage apparatus 20.

Hereinafter, the present embodiment will be described taking a case in which a specific person is designated as a search target. The search target may be set by a user operation. Alternatively, it is also possible to automatically extract an arbitrary person from the images and set the extracted person as the search target.

S402: Search Target Tracking Processing

Next, the search target tracking unit 220 tracks the search target set by the search target setting unit 210 in the images stored in the image storage unit 100. First, the search target tracking unit 220 acquires image data of the search target from the image data stored in the image storage unit 100 based on the identification number of the surveillance camera set by the user in S401, the frame number of the image in the camera images, and the position coordinates indicating the target region in the images. Next, the search target tracking unit 220 performs tracking processing for tracking the target in consecutive images in time series of the surveillance camera images by using the acquired image data of the search target, and sequentially obtains position coordinates indicating the target region in the image. To be more specific, the search target tracking unit 220 tracks the search target in images captured, after capturing of the image used to set the search target, by the surveillance camera that captured the image used by the search target setting unit 210 to set the search target.

For example, a method described in Color-Based Probabilistic Tracking, by P. Perez et al., ECCV (2002) may be used as the processing of tracking an object in images. According to this method, each color histogram feature is extracted from image data, and the position of a target is associated between frames with the use of a particle filter. The tracking processing is not limited to this method, and it is also possible to use any other method.

S403: Non-Search Target Setting Processing

Next, the non-search target setting unit 230 sets, as a non-search target, a target other than the search target set by the search target setting unit 210 in the image stored in the image storage unit 100.

First, an image captured by another surveillance camera at substantially the same captured time is acquired from the image storage unit 100 based on the identification number of the camera used by the user when setting the search target in S401, and the frame number of the image in the camera images. Then, the object detecting unit 200 detects a person region from the acquired image data, associates the position coordinates indicating the detected person region with the frame number of the image data, and stores them in the detection result storage unit 110. Note that it is assumed that the ranges captured by the surveillance cameras do not overlap with each other, or in other words, a person captured by a surveillance camera is not captured by another surveillance camera at the same time.

Here, as the processing for detecting a person performed by the object detecting unit 200, for example, a method described in Histograms of Oriented Gradients for Human Detection, by Dalal and Triggs, CVPR (2005) can be used. According to this method, histograms of oriented gradients are extracted from image data, and it is identified whether a partial region clipped from the image is a person with the use of a support vector machine. The person detecting processing is not limited to this method, and any other method may be used.

The person region detected here is a person region acquired from another surveillance camera that is different from the surveillance camera set by the user, and the captured time is substantially the same. Accordingly, it can be treated as another person who is different from the search target person. Therefore, the object region of the person detected in this step is set as a non-search target.

Also, a person region other than the search target included in the image used by the user to set the search target in S401 is detected, the position coordinates indicating the detected person region is associated with the frame number of the image data, and they are stored in the detection result storage unit 110. In FIG. 5, other than the search target, two persons are captured, and thus the position coordinates indicating each of the two persons are stored in the detection result storage unit 110 in association with the frame number of the image data of the image.

S404: Attribute Extraction Processing

Next, the object attribute extracting unit 240 extracts a plurality of object attributes based on the image stored in the image storage unit 100 and the position coordinates indicating the person region stored in the detection result storage unit 110. In the present embodiment, the search target is a person, and thus as a plurality of attributes of the person, age group and gender attributes, the color of head, the color of clothing, and the geometrical features of face and body shape are acquired.

As the age group and gender attributes, the age group and gender are estimated from feature amounts extracted from a face image based on a statistical probability model. As the age group, the most probable age group is estimated from the age group of less than 2 years, the age group of 2 to 5 years, the age group of 6 to 9 years, the age group of 10 to 14 years, the age group of 15 to 19 years, the age group of 20's, the age group of 30's, the age group of 40's, the age group of 50's, the age group of 60's, and the age group of 70's and over. As the gender, the degree of distinction between men and women is estimated. The color of head indicates the type of hair, headgear or the like. As the color of clothing, color features are extracted separately from the upper part and the lower part of the body. The geometrical features of face and body shape are indicated by an eccentricity obtained by applying ellipse fitting to each face contour, and an eccentricity obtained by applying ellipse fitting to the entire body contour, respectively.

These attributes are extracted for each person region, classified into any one of the search target set in S401, the search target tracked and acquired in S402 and the non-search target set in S403, and then stored in the attribute storage unit 120.

The extracted attributes are not limited to those described above, and other attributes may be used as long as they are features that can be used to classify the search target object (a person in the present embodiment). For example, the attributes are not limited to the features obtained from the images, and if audio data can be obtained from the images, features based on the sound pitch may be used as the attributes.

S405: Identification Performance Evaluation Processing

Next, the identification performance evaluating unit 250 evaluates the identification performance of each of the plurality of object attributes based on statistical information of the object attributes extracted by the object attribute extracting unit 240 and stored in the attribute storage unit 120. For example, a case will be described below in which the facial age group attribute is evaluated. An attribute value obtained from image data yi of Ny search target regions is defined as $a\_yi$ ($yi=1, 2, \ldots$ and Ny). A characteristic value obtained from FIG. 5 is defined as $a\_1$, and an attribute value obtained from (Ny−1) search targets by the tracking processing performed in S402 is defined as $a\_yi$ ($yi=2, \ldots$ and Ny). Also, an attribute value obtained from image data ni of Nn non-search target regions set in S403 is defined as $A\_ni$ ($ni=1, 2, \ldots$ and Nn).

Here, these attribute values are classified into N classes such as $c1, c2, \ldots$ and $cN$, so as to obtain histograms for each of the search target and the non-search targets. The N classes including classes $c1, c2, \ldots$ and $cN$ are the age group of less than 2 years, the age group of 2 to 5 years, the age group of 6 to 9 years, the age group of 10 to 14 years, the age group of 15 to 19 years, the age group of 20's, the age group of 30's, the age group of 40's, the age group of 50's, the age group of 60's, and the age group of 70's and over.

Figure 6A:
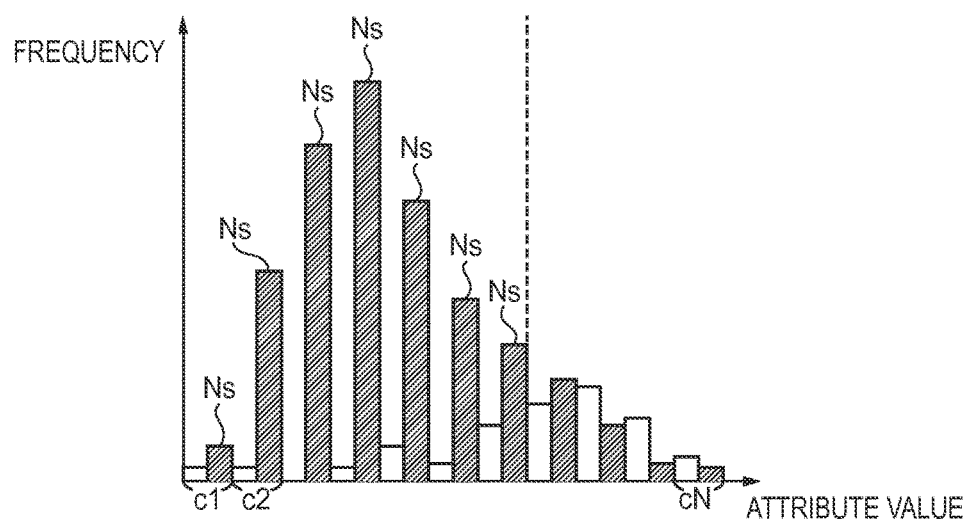
FIGS. 6A and 6B are diagrams showing examples of histograms of a search target and a non-search target according to an embodiment of the present invention.
Figure 6B:
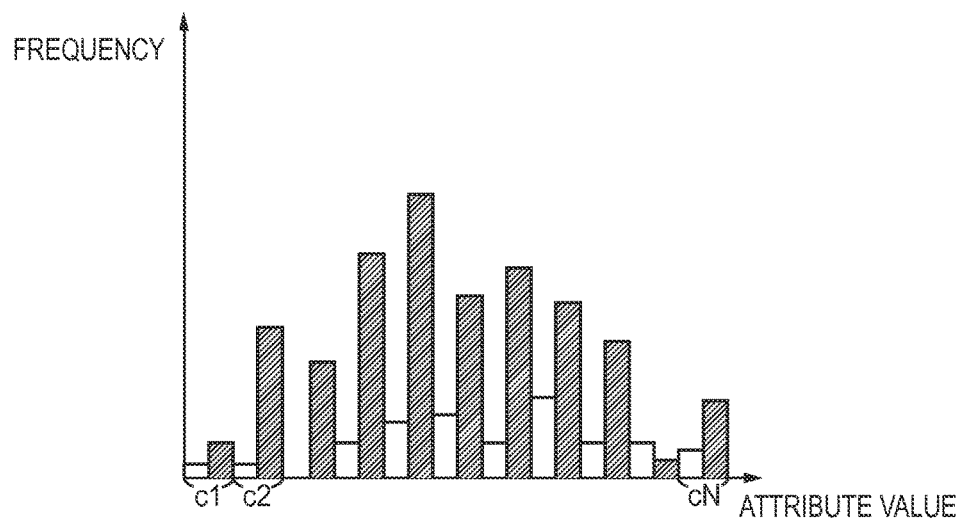

FIGS. 6A and 6B show examples of the obtained histograms. In the diagrams, white bars and black bars respectively indicate the frequency of a search target and the frequency of a non-search target. FIGS. 6A and 6B are examples of histograms of the facial age group attribute when different search targets are set at two different timings.

In both of FIGS. 6A and 6B, the number of person regions set as the search target is smaller than the number of person regions set as the non-search target.

Next, the identification performance of the object attribute is evaluated by determining how much the statistical distribution is different between the white bars and the black bars. As shown in FIG. 6A, the average value of the age group attribute is compared between the search target and the non-search target, and if the average value of the search target (white bars) is greater than that of the non-search target (black bars), for example, the number Ns of non-search targets having attribute values smaller than the average value (indicated by the broken line in FIG. 6A) of the age group attribute of the search target (white bars) is obtained from the histogram. For example, if the average value is 40's, the number Ns of non-search targets at the age of 30's or younger is obtained.

Ns represents the number of non-search targets that can be separated based on the average value of the age group attribute of the search target, and thus the degree of separation S is defined by the following Equation (1).

[Math. 1]

$$S = Ns/Nn \qquad (1)$$

For example, if the age group attributes of the search target and the non-search target are distributed as shown in FIG. 6B, the degree of separation S is small. That is, the following is established: the degree of separation S in the example shown in FIG. 6A>the degree of separation S in the example shown in FIG. 6B, and it can be said that the identification performance of the object attribute shown in FIG. 6A is better than that of the object attribute shown in FIG. 6B. If the degree of separation S is greater, it indicates that the object attribute is more characteristic of the search target person, and distinguished from the non-search target person.

The degree of separation S is determined by determining the number of non-search targets based on the average value of the age group attribute of the search target used as a reference, but the reference value may be, for example, a value obtained by multiplying the average value by a predetermined ratio, or may be determined by using both the average value and the variance.

Likewise, the identification performance evaluation is performed on another object attribute extracted by the object attribute extracting unit 240 by using the degree of separation.

In the present embodiment, an example is described in which the identification performance evaluation of the search target and the non-search target is performed by obtaining histograms of the search target and the non-search target and deriving the degree of separation therefrom. Other than this, it is also possible to evaluate the degree of separation by using the class average value of each of the search target and the non-search target, which is used in the Fisher linear discriminant method by using a class value of each class of the age group attribute, and the within-class variance of the attribute value of the search target and the non-search target.

Also, in the present embodiment, the number Ns of non-search targets having attribute values smaller than the average value of the search target is obtained from the histograms, but it is also possible to obtain the number Ns of non-search targets having attribute values greater than the average value of the search target. In this case, the degree of separation S may be defined as S=(Nn−Ns)/Nn. Other than this, any method can be used as long as it is possible to evaluate the degree of variations in the statistical distribution.

S406: Weighting Factor Determination Processing

Next, the weighting factor determining unit 260 determines the weighting factor of each of the plurality of object attributes based on the results of evaluation performed by the identification performance evaluating unit 250. The simplest way is to use the degree of separation determined for each object attribute as the weighting factor of the object attribute. Other than this, it is possible to use a method that determines a weighting factor by using the Fisher linear discriminant method, a method that sets a plurality of appropriate sets of weighting factors within a range that satisfies the magnitude relationship of the degree of separation of each object attribution obtained in S405, and selects an optimal set of weighting factors, or the like.

That is, a greater weighting factor is assigned to an object attribute whose degree of separation determined by the identification performance evaluating unit 250 is greater. Because the object attribute whose degree of separation is greater has a high level of identification performance, the weighting factor is increased.

S407: Object Search Processing

Next, the object search unit 270 searches for a search target object based on the results (integrated similarity) obtained by combining the weighting factors determined by the weighting factor determining unit 260 and the similarities of the plurality of object attributes extracted by the object attribute extracting unit 240. It is assumed here that the search range, or in other words, the surveillance camera image on which the search is performed and the frame number of the image in the surveillance camera images on which the search is performed have already been set.

The object search unit 270 acquires image data stored in the image storage unit 100 from this search range. Then, the object detecting unit 200 detects a person region from the acquired image data, associates the position coordinates indicating the detected person region with the frame number of the image data, and stores them in the detection result storage unit 110.

Then, the object attribute extracting unit 240 extracts a plurality of object attributes based on the image stored in the image storage unit 100 and the position coordinates indicating the person region stored in the detection result storage unit 110. That is, the age group and gender attributes, the color of head, the color of clothing, and geometrical features of face and body shape are acquired for each person region. The acquired attributes are stored in the attribute storage unit 120.

Then, the object search unit 270 obtains, for each person region detected by the object detecting unit 200, similarities between the plurality of object attributes extracted by the object attribute extracting unit 240 and the object attributes of the search target set by the user in S401. Here, if an object attribute of attribute Ak in a single person region is defined by ak, and an object attribute of the search target set by the user is defined by ak_q, similarity sk of the attribute Ak can be represented by the following Equation (2).

[Math. 2]

$$sk = sim(ak, ak\_q) \qquad (2)$$

In the above equation, sim(a, b) is a function representing the similarity between two values a and b, and can be calculated as, for example, $(a-b)^2$. Likewise, similarity is determined for each of a plurality of object attributes Ak (k=1, 2, . . . and Na, where Na is the number of object attributes). Then, integrated similarity s in which the determined similarity of the attribute is integrated with the weighting factor determined by the weighting factor determining unit 260 is determined by Equation (3). In the equation, wk is the weighting factor for the object attribute Ak.

[Math. 3]

$$s = \sum_{k=1}^{Na} wk \cdot sk \qquad (3)$$

The integrated similarity s is a total sum of products of similarities between a plurality of object attributes of a search target newly extracted from the images of the plurality of capturing apparatuses and a plurality of object attributes of the search target extracted in advance, and the corresponding weighting factors. However, the integrated similarity s is not limited to the total sum of the products, and any other integrated similarity may be derived. For example, a configuration is possible in which only object attributes whose weighting factor is a predetermined value or more are used. In this case, the computation time can be further shortened.

The object search unit 270 performs an object search by sorting the determined integrated similarity of each person region and displaying them on the output apparatus 40 in the descending order. Through the processing of the steps S401 to S407 described above, an efficient search that takes into account of the entire state of the surveillance system is implemented by the image search apparatus that searches the images obtained from a plurality of surveillance cameras for a specific object.

The user can specify a search target and a non-search target by viewing the results of search displayed on the output apparatus 40 in S407. A more highly accurate search can be implemented by the user further setting the results as a search target and a non-search target via the input apparatus 30, and repeatedly reflecting it to each processing of steps S401 to S407 of the present embodiment.

For example, if nine person images are displayed on the output apparatus 40 based on the integrated similarity, the person images are different from the image of the search target set from the image shown in FIG. 5 in S401. Furthermore, the person images are also different from any of the images of the search target tracked in S402 based on the image of the search target set from the image shown in FIG. 5, and the images of the non-search targets set in S403 based on the image of the search target set from the image shown in FIG. 5. Accordingly, the attributes extracted from the search target and the non-search targets set from the images displayed in S407 are different from the attributes extracted when the search target was set from the image shown in FIG. 5. Then, the user sets, through the input apparatus 30, an image that needs to be distinguished from the search target, which was determined as similar to the search target in S407. It is thereby possible to implement a more accurate search.

As described above, according to the present embodiment, in the image search apparatus that performs a search by using a plurality of object attributes, a search target and a non-search target that is other than the search target are set. Then, a plurality of object attributes of an object region serving as a search target and an object region serving as a non-search target are extracted from one or more images captured by at least one capturing apparatus, and the identification performance is evaluated by determining the statistical information for each of the plurality of object attributes. Then, the weight of the object characteristic having good identification performance is set to be high, which is reflected to the object search. It is thereby possible to implement an efficient search that takes into account of the entire state of the surveillance system.

Also, the present embodiment is configured such that the non-search target other than the search target is set from an image captured by another surveillance camera at substantially the same time as the surveillance camera used to set the search target, and thus it is possible to more accurately evaluate the identification performance of the object attributes based on which a search is performed. The present invention is useful to search a monitored area for a person, the monitored area being an area where the distribution of people remains relatively unchanged in a short period of time, such as a shopping center, an airport or the like.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-248344, filed Nov. 29, 2013, which is hereby incorporated by reference herein in its entirety.

What is claimed is:

1. A search apparatus connected to a first capturing apparatus and to a second capturing apparatus, wherein areas captured by the first capturing apparatus and the second capturing apparatus do not overlap each other, the search apparatus comprising:
a processor, and a memory configured to store instructions to be executed by the processor for causing the search apparatus to perform operations comprising:
extract a plurality of attributes from a plurality of objects in captured images captured by the first capturing apparatus and by the second capturing apparatus;
determine a search target in a first captured image captured by the first capturing apparatus based on user designation;
determine at least one other object other than the search target from a second captured image captured by the second capturing apparatus based on a captured time of the first captured image; and
determine a search condition used in a search for the search target in a third captured image, wherein attributes used as the search condition are determined based on the difference between a plurality of attributes of the search target in the first captured image captured by the first capturing apparatus and a plurality of attributes of the at least one other object in the second captured image captured by the second capturing apparatus.

2. The search apparatus according to claim 1,
wherein the operations further comprise:
  determine weights for the plurality of attributes of the search target based on a comparison between the plurality of attributes of the search target and the plurality of attributes of the at least one other object; and
  determine the search condition based also based on the weights.

3. The search apparatus according to claim 1, wherein types of the plurality of attributes of the search target correspond to types of the plurality of attributes of the at least one other object.

4. A search method of a search apparatus, wherein the search apparatus is connected to a first capturing apparatus and to a second capturing apparatus, wherein areas captured by the first capturing apparatus and the second capturing apparatus do not overlap each other, the method comprising:
  extracting a plurality of attributes from a plurality of objects in captured images captured by the first capturing apparatus and by the second capturing apparatus;
  determining a search target in a first captured image captured by the first capturing apparatus based on user designation;
  determining at least one other object other than the search target from a second captured image captured by the second capturing apparatus based on a captured time of the first captured image; and
  determining a search condition used in a search for the search target in a third captured image, wherein attributes used as the search condition are determined based on the difference between a plurality of attributes of the search target in the first captured image captured by the first capturing apparatus and a plurality of attributes of the at least one other object in the second captured image captured by the second capturing apparatus.

5. The search method according to claim 4, further comprising:
  determining weights for the plurality of attributes of the search target based on a comparison between the plurality of attributes of the search target and the plurality of attributes of the at least one other object; and
  determining the search condition also based on the weights.

6. A non-transitory computer-readable storage medium storing a computer program for searching for an object using a search apparatus, wherein the search apparatus is connected to a first capturing apparatus and to a second capturing apparatus, wherein areas captured by the first capturing apparatus and the second capturing apparatus do not overlap each other, the program comprising:
  extracting a plurality of attributes from a plurality of objects in captured images captured by the first capturing apparatus and by the second capturing apparatus;
  determining a search target in a first captured image captured by the first capturing apparatus based on user designation;
  determining at least one other object other than the search target from a second captured image captured by the second capturing apparatus based on a captured time of the first captured image; and
  determining a search condition used in a search for the search target in a third captured image, wherein attributes used as the search condition are determined based on the difference between a plurality of attributes of the search target in the first captured image captured by the first capturing apparatus and a plurality of attributes of the at least one other object in the second captured image captured by the second capturing apparatus.

7. The non-transitory computer-readable storage medium according to claim 6,
wherein the program further comprises:
  determining weights for the plurality of attributes of the search target based on a comparison between the plurality of attributes of the search target and the plurality of attributes of the at least one other object; and
  determining the search condition also based on weights.

8. The search method according to claim 4, wherein types of the plurality of attributes of the search target correspond to types of the plurality of attributes of the at least one other object.

9. The non-transitory computer-readable storage medium according to claim 6, wherein types of the plurality of attributes of the search target correspond to types of the plurality of attributes of the at least one other object.

* * * * *